(12) United States Patent
Akselrod et al.

(10) Patent No.: US 11,851,582 B2
(45) Date of Patent: Dec. 26, 2023

(54) THERMAL SIGNATURE CONTROL STRUCTURES

(71) Applicant: Elwha LLC, Bellevue, WA (US)

(72) Inventors: Gleb M. Akselrod, Bellevue, WA (US); Erik Edward Josberger, Seattle, WA (US); Mark C. Weidman, Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 17/561,847

(22) Filed: Dec. 24, 2021

(65) Prior Publication Data
US 2022/0186044 A1    Jun. 16, 2022

Related U.S. Application Data

(63) Continuation of application No. 15/981,354, filed on May 16, 2018, now Pat. No. 11,208,568.
(Continued)

(51) Int. Cl.
*G02B 1/116* (2015.01)
*C09D 5/00* (2006.01)
(Continued)

(52) U.S. Cl.
CPC .............. *C09D 5/32* (2013.01); *C09D 5/006* (2013.01); *F41H 3/00* (2013.01); *G02B 1/002* (2013.01);
(Continued)

(58) Field of Classification Search
CPC ....... B01L 2200/0668; B01L 3/502761; B01L 3/502753; B01L 2300/089; B01L 2400/0454; B01L 3/502792; B01L 2300/0819; B01L 3/50273; B01L 2400/0415; B01L 3/502715; B01L 2200/0663; B01L 2200/0652; B01L 2400/086; B01L 2200/025; B01L 2200/026; B01L 2200/027; B01L 2200/028; B01L 2200/04; B01L 2200/0684; B01L 2200/0689; B01L 2200/087; B01L 2200/10; B01L 2200/16; B01L 2300/023; B01L 2300/025; B01L 2300/04; B01L 2300/044; B01L 2300/06; B01L 2300/0627; B01L 2300/0645; B01L 2300/0681; B01L 2300/0816; B01L 2300/0838; B01L 2300/0864; B01L 2300/0867; B01L 2300/087; B01L 2300/0896;
(Continued)

(56) References Cited

U.S. PATENT DOCUMENTS 5,654,797 A    8/1997 Moreau
2007/0171120 A1*    7/2007 Puscasu ............. H01Q 15/0066
                                                              342/53
(Continued)

OTHER PUBLICATIONS

PCT International Search Report, International App. No. PCT/US2018/033110, dated Sep. 13, 2018, pp. 1-5.

*Primary Examiner* — Brandi N Thomas
(74) *Attorney, Agent, or Firm* — Kory D. Christensen

(57) ABSTRACT

Subwavelength conducting particles can be arranged on conducting surfaces to provide arbitrary thermal emissivity spectra. For example, a thermal emissivity spectrum can be tailored to suppress a thermal signature of an object without sacrificing radiative cooling efficiency.

32 Claims, 4 Drawing Sheets

Related U.S. Application Data

(60) Provisional application No. 62/507,496, filed on May 17, 2017.

(51) Int. Cl.
| | | |
|---|---|---|
| *C09D 5/32* | (2006.01) | |
| *F41H 3/00* | (2006.01) | |
| *G02B 1/00* | (2006.01) | |
| *G02B 1/118* | (2015.01) | |
| *G02B 5/20* | (2006.01) | |

(52) U.S. Cl.
CPC .............. *G02B 1/116* (2013.01); *G02B 1/118* (2013.01); *G02B 5/204* (2013.01)

(58) Field of Classification Search
CPC ........... B01L 2300/12; B01L 2300/161; B01L 2300/1827; B01L 2400/0406; B01L 2400/0487; B01L 2400/0677; B01L 2400/0683; B01L 3/5027; B01L 3/502723; B01L 3/502738; B01L 3/5029; B01L 2300/0636; B01L 2300/0654; B01L 2200/0647; G01N 2015/149; G01N 33/54313; G01N 15/0266; G01N 2015/0288; G01N 30/0005; G01N 2030/0035; G01N 1/02; G01N 2001/027; G01N 2001/028; G01N 2035/00277; G01N 2035/00564; G01N 21/78; G01N 2458/30; G01N 27/28; G01N 27/3271; G01N 27/3272; G01N 27/3273; G01N 33/54306; G01N 33/54326; G01N 33/54333; G01N 33/54366; G01N 33/54373; G01N 33/5438; G01N 33/581; G01N 35/00029; G01N 35/0098; G01N 35/08; G01N 35/1095; G01N 2021/6463; G01N 2021/6478; G01N 21/6428; G01N 21/6452; G01N 21/6456; G01N 1/10; G01N 1/34; G01N 27/327; G01N 27/416; G01N 33/58; G02B 6/0051; G02B 6/005; G02B 3/0012; G02B 6/0096; G02B 3/0056; G02B 6/0065; G02B 5/0242; G02B 5/0226; G02B 5/0268; G02B 5/0278; G02B 6/0036; G02B 6/0043; G02B 26/008; G02B 27/0972; G02B 27/1006; G02B 27/141; G02B 3/0043; G02B 1/002; G02B 1/116; G02B 1/118; G02B 5/204; G02B 6/0023; G02B 6/0035; G02B 6/0046; G02B 6/0058; G02B 6/0073
See application file for complete search history.

(56) References Cited

U.S. PATENT DOCUMENTS

| | | |
|---|---|---|
| 2009/0073400 A1 | 3/2009 | Wolfe |
| 2009/0258448 A1 | 10/2009 | Xiao |
| 2010/0149631 A1* | 6/2010 | Oshika .................. G02F 1/167 359/296 |
| 2015/0062686 A1 | 3/2015 | Smith et al. |

* cited by examiner

`US 11,851,582 B2`

THERMAL SIGNATURE CONTROL STRUCTURES

CROSS-REFERENCE TO RELATED APPLICATIONS

This application claims the benefit of U.S. Provisional Patent Application No. 62/507,496, filed May 17, 2017, entitled THERMAL SIGNATURE CONTROL STRUCTURES, which is herein incorporated by reference in its entirety.

BACKGROUND AND SUMMARY

Subwavelength conducting particles can be arranged on a conducting surface to provide a structure with a selective absorption spectrum for electromagnetic radiation. See, e.g., A. Moreau et al, "Controlled-reflectance surfaces with film-coupled colloidal nanoantennas," Nature 492, 86-89 (December 2012); and D. R. Smith et al., U.S. Pat. No. 9,606,414; each of which is herein incorporated by reference. An example of such a structure, sometimes referred to as a metasurface, is shown in FIG. 1A-1B. In the example, small conducting particles 101 are arranged on a conducting surface 102, with a dielectric spacer layer 103 interposed between each particle and the underlying surface (FIG. 1A shows an above view of the surface, while FIG. 1B shows a close-up cross section of a single particle). Each conducting particle has a flat lower surface and forms a planar gap region between the conducting particle and the conducting surface (in this example, the particles are cubes, but any shape having a flat lower surface would suffice). The planar gap region supports a Fabry-Perot resonance mode, with an exemplary electric field pattern for the mode seen in the close-up of FIG. 1B.

As explained in the references cited above and in further detail below, the resonant wavelength of the Fabry-Perot mode, and thus the absorption spectrum for the structure, can be designed by selecting an appropriate geometry for the structure, e.g. by appropriate selection of the length and thickness of the planar gap region. For example, a resonant wavelength of about 11 microns may be obtained for gold cubes with an edge length of 500 nm, arranged on an underlying gold surface with a 20 nm silica spacer layer. In typical embodiments, the length of the planar gap region might range from about one-half to one-twentieth of the resonant wavelength, depending on the thickness of the gap region and the materials used.

The present application relates to metasurfaces that are structured to provide a selected thermal emissivity spectrum. By Kirchoff's radiation law, the spectrum of thermal emissivity of an object is identical to the absorption spectrum for the object. Thus, by designing the sizes of conducting particles and their arrangements on one or more conducting surfaces, an arbitrary thermal emissivity spectrum can be obtained. For example, the structure can be designed to significantly suppress an observed thermal signature of an object (e.g. as viewed with a thermal infrared detector) without significantly sacrificing radiative cooling efficiency. These metasurfaces can be fabricated using colloidal or photolithographic processes, and can be applied onto the surface of any object (e.g. by painting or lamination) to tailor the thermal emissivity spectrum of that object.

DETAILED DESCRIPTION

Figure 1A:
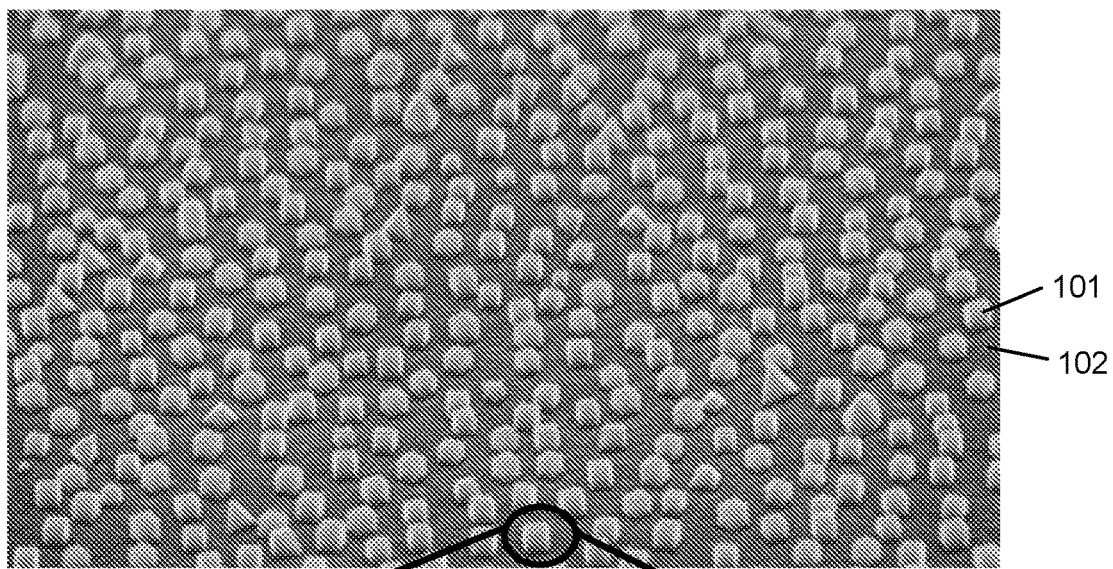
FIGS. 1A-1B depict an example of a metasurface.
Figure 1B:
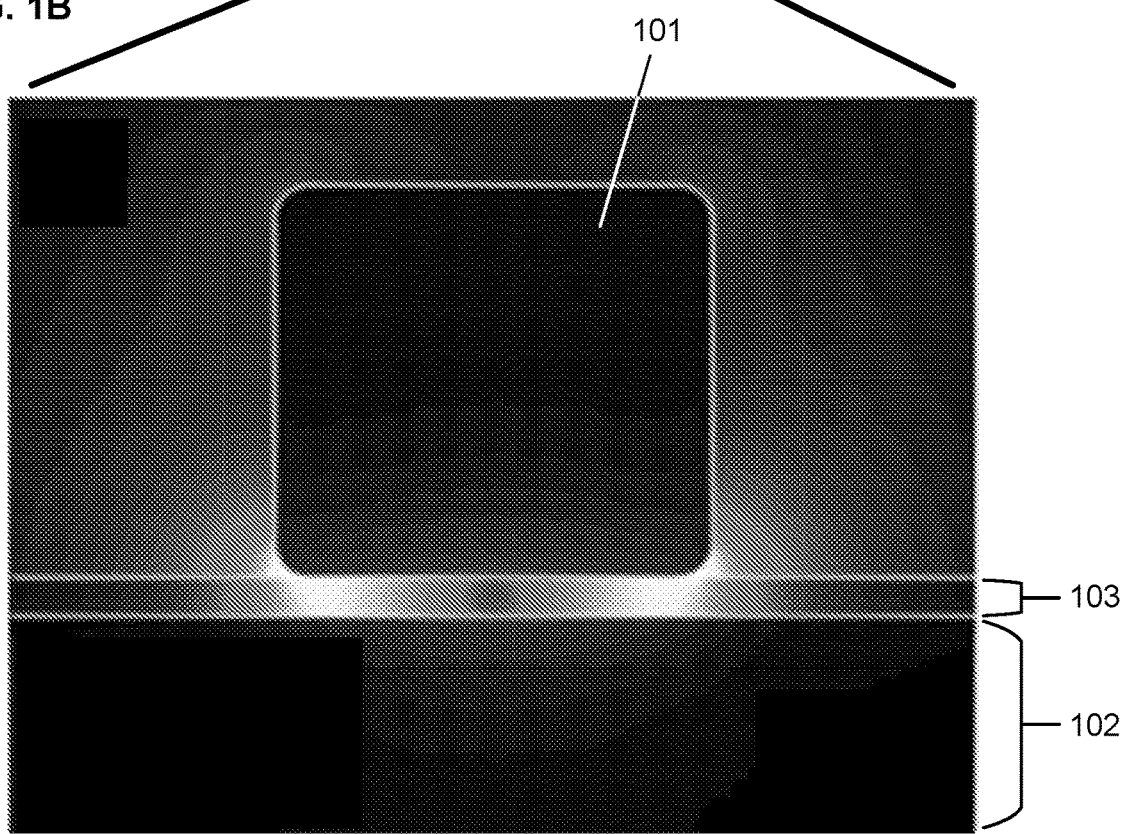

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 2A:
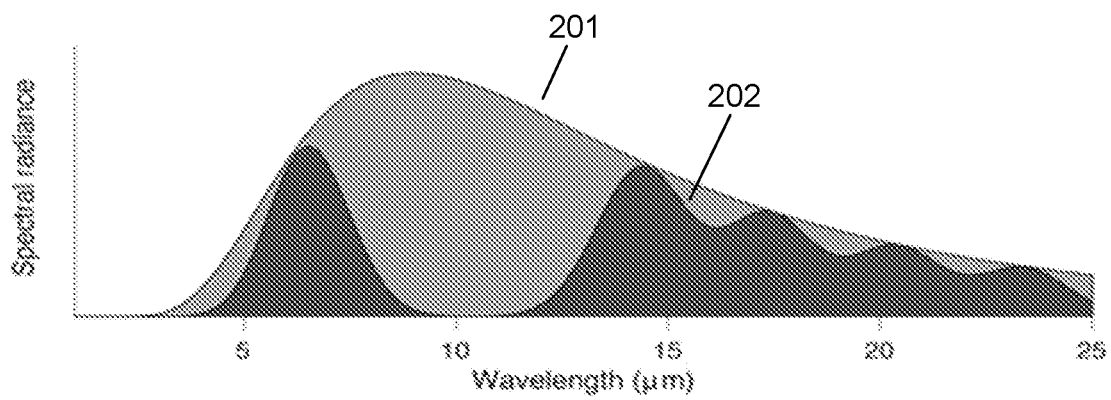
FIGS. 2A-2C depict thermal emissivity spectra.
Figure 2B:
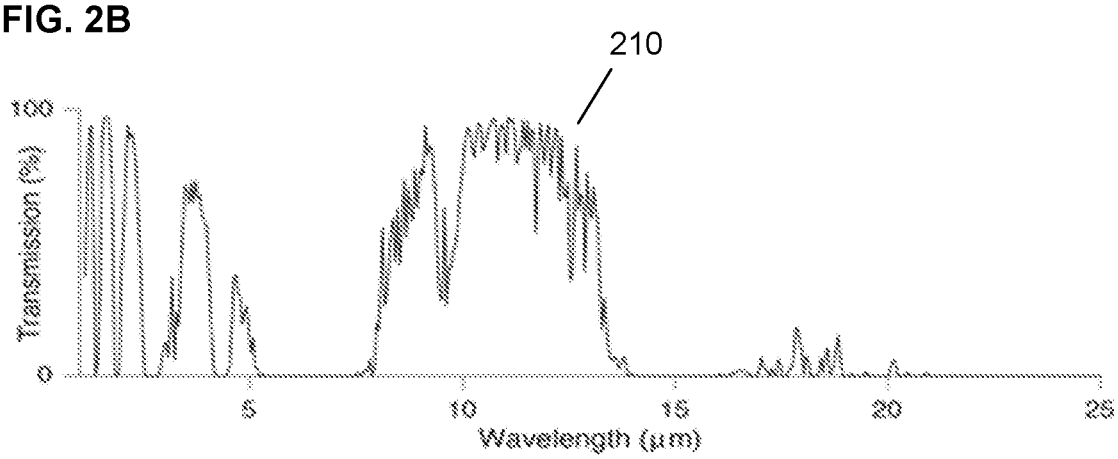
Figure 2C:
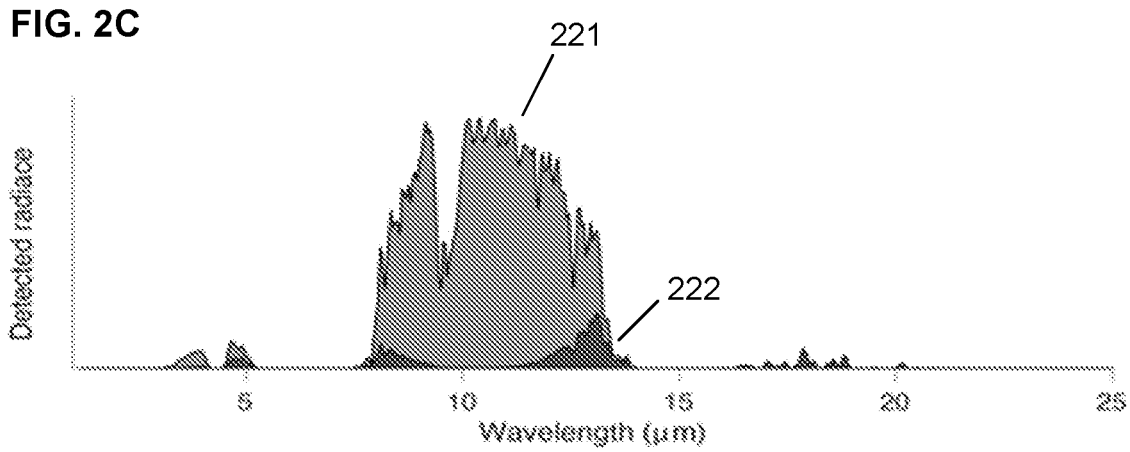

FIGS. 2A-2C illustrate an example of designing a thermal emissivity spectrum for a metasurface. In this example, the thermal emissivity spectrum is designed to significantly suppress a thermal signature of an object (e.g. by a factor of 10 or more), while maintaining significant radiative cooling efficiency. Consider, for example, an object having a temperature of 50° C. If the object were a blackbody (i.e. a perfect absorber), it would have a blackbody thermal emissivity 201 as a function of wavelength, as shown in FIG. 2A.

Suppose that the object is remotely observed with a thermal infrared detector. As shown in FIG. 2B, the atmospheric transmission spectrum 210 of thermal infrared radiation is highly wavelength-dependent, with significant transmission in particular transmission bands (e.g. 3-to-5 microns, 8-to-13-microns) and strong atmospheric absorption at other wavelengths. Thus, the blackbody emissivity spectrum 201 would translate into an detected radiance 221 at the thermal infrared detector, as shown in FIG. 2C. The spectral integral of this detected radiance is one useful measure of the thermal signature of the observed object.

Now, suppose that the object is covered with a metasurface that is designed to have a different thermal emissivity spectrum 202 as shown in FIG. 2A. Here, the emissivity spectrum is designed to be substantially reduced relative to the blackbody spectrum 201 in a selected spectral range, in this case, a spectral range corresponding to the 8-to-13-micron atmospheric transmission band (the multiple peaks are indicative of multiple resonant wavelengths for the conducting particles arranged on the metasurface, as further discussed below). This modified thermal radiance 202 translates into a modified detected radiance 222 at the thermal infrared detector, as shown in FIG. 2C. Again using the spectral integral of the detected radiance as a useful measure of the thermal signature of the observed object, it can be seen that the metasurface-covered object has a significantly reduced thermal signature; in this case, the thermal signature is reduced by a factor of about 12.

At the same time, FIG. 2A illustrates that the radiative cooling rate, or radiative cooling efficiency, of the object is not comparably suppressed by the metasurface cover. The radiative cooling efficiency can be expressed as the spectral integral of the thermal emissivity spectrum over all frequencies. Outside of the selected spectral range for emission suppression, the emissivity spectrum is not substantially reduced relative to the blackbody spectrum; in this case, the overall radiative cooling efficiency is therefore only reduced by about 50%.

With a thermal emission spectrum designed as in FIGS. 2A-2C, significant radiative cooling of a hot object can be achieved while substantially concealing the heat of the object from a distant thermal infrared detector, by making the object appear to be substantially cooler than its actual temperature. Consider, for example, a 10 cm spherical object placed in a 20° C. ambient environment, and suppose that the object is exposed to a 1000 W heat source. If the object were a blackbody (perfect absorber), it would reach a steady state temperature of about 240° C., and this would be the apparent temperature of the object as seen by a thermal imager. If the object were a whitebody (perfect reflector), it would have an apparent temperature of only 20° C. (the ambient temperature), but the actual steady state temperature would be significantly higher at 414° C. Coating the object with a metasurface designed to have a thermal emission spectrum as in FIGS. 2A-2C yields a compromise of the two extremes, in that the object would not become as hot as the whitebody (actual steady state temperature of about 297° C., versus 414° C. for the whitebody), and it would not appear as hot as the blackbody (apparent temperature of 53° C., versus 240° C. for the blackbody).

While the above discussion of FIGS. 2A-2C describes the thermal signature suppression in terms of an emissivity spectrum multiplied by atmospheric transmission as a function of wavelength (and then integrated over all wavelengths), in another approach, the thermal signature is instead defined in terms of an emissivity spectrum multiplied by a thermal detector response as a function of wavelength (and then integrated over all wavelengths). In yet another approach, the thermal signature is instead defined in terms of an emissivity spectrum that is integrated over a selected spectral range, which could be a range of atmospheric transmission or a range of detector response for a thermal infrared detector. In many contexts, these different approaches will yield comparable results as they commonly reflect inherent limitations in the remote detection of thermal signatures.

The thermal emissivity spectrum of the metasurface can be designed by arranging a plurality of differently-sized conducting particles on a conducting surface. Then the particles would have a set of resonant wavelengths corresponding to a set of sizes of the conducting particles. The thermal emissivity may be thereby enhanced within linewidths of the resonant wavelengths, and reduced outside of these linewidths. The heights of the resonant peaks can be increased or decreased by changing the relative concentrations (i.e. surface densities) of particles at each of the different sizes, while the widths of the resonant peaks by can be increased or decreased by, for example, using trapezoidal (as opposed to cubic or cuboidal) particles. Thus, by appropriate selection of the sizes, shapes, and concentrations of the various conducting particles on the conducting surface, the thermal emissivity spectrum can be practically custom-tailored.

Figure 3A:
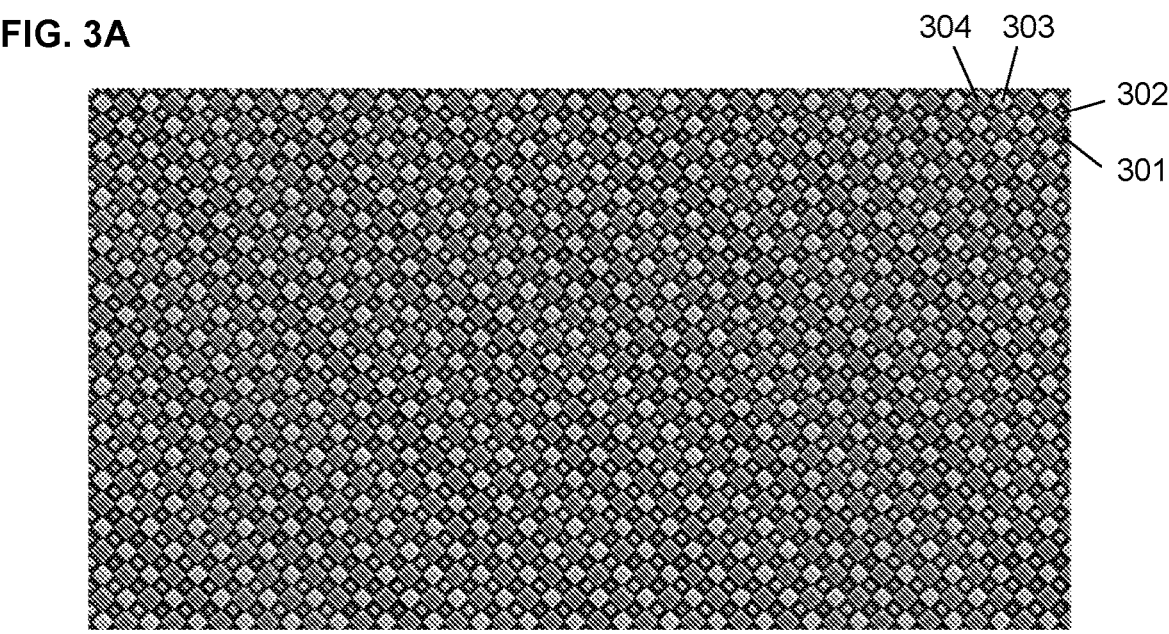
FIGS. 3A-3B depict an example of tailoring thermal emissivity.
Figure 3B:
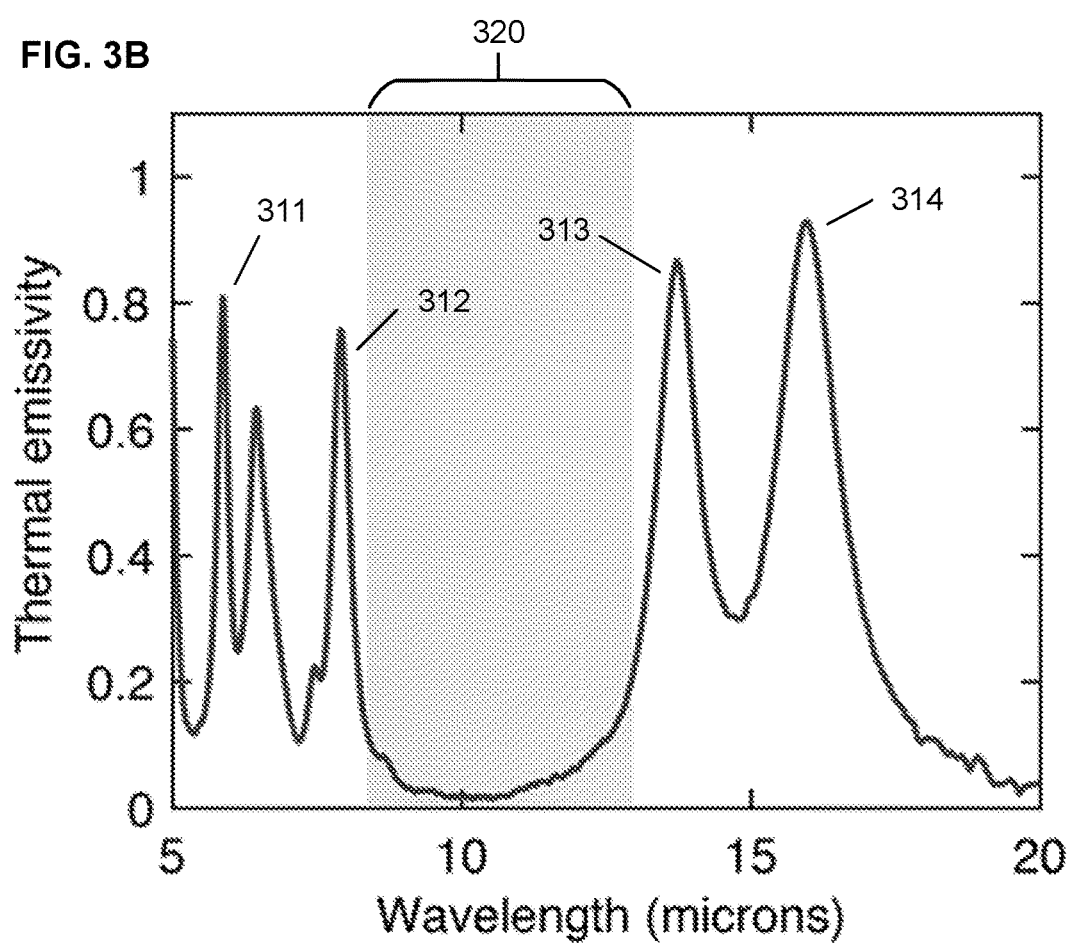

An example of this custom tailoring is shown in FIGS. 3A-3B. FIG. 3A depicts an electron microscope image of a metasurface that is populated with an array of particles having four different sizes 301 (violet), 302 (blue), 303 (green), and 304 (red). The thermal emission spectrum for this metasurface, shown in FIG. 3B, features four prominent emission peaks 311-314 corresponding to the four different sizes 301-304. The four sizes were selected so that two emission peaks would be situated below a selected spectral band 320 and two emission peaks would be situation above the selected spectral band 320; consequently, thermal emission is suppressed within the selected spectral band 320, due to an absence of resonances therein.

Figure 4:
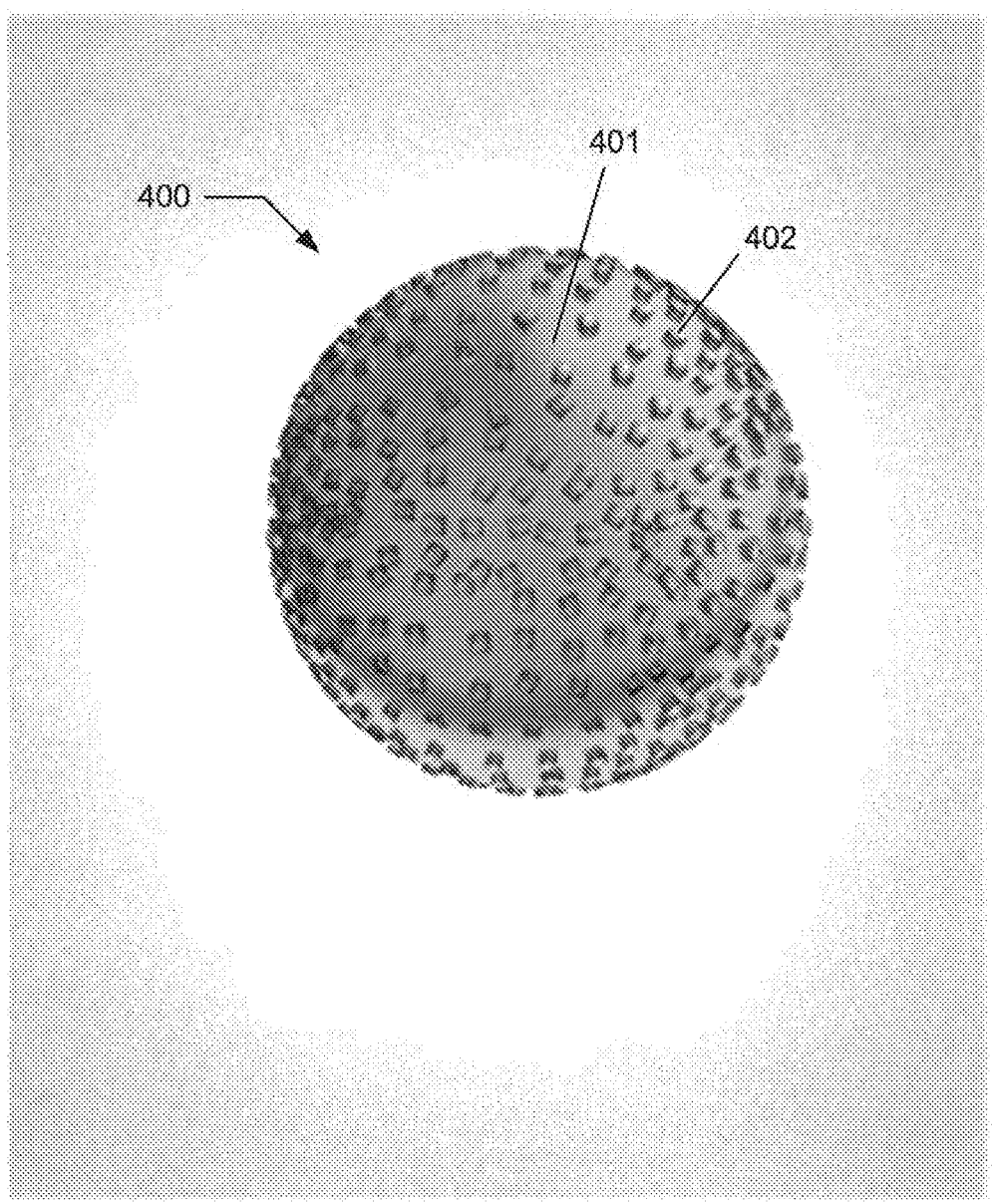
FIG. 4 depicts an example of a constituent unit for a composition.

While the above discussion has focused on laminar embodiments having a single conducting surface with an arrangement of conducting particles distributed thereon, composition embodiments provide multiple conducting surfaces, each the surface of a larger conducting particle, with smaller conducting particles distributed thereon. An example is shown in FIG. 4, which depicts a constituent unit 400 for a composition, the constituent unit including a larger conducting particle 401 having a plurality of smaller conducting particles 402 arranged on its surface. Because the larger conducting particle is significantly larger than each of the smaller conducting particles, the surface of the larger conducting particle is locally planar under each of the smaller conducting particles, providing planar regions between the larger particle and each smaller particle just as with the laminar embodiments. In typical scenarios, the larger particles might be as small as 10 microns or as large as a 2-3 millimeters, while the smaller particles might be as small as 200 nanometers or as large as 5 microns.

In some embodiments, the structure is covered by a layer that protects and/or conceals the underlying structure. For example, the structure may be covered with ZnO or FeO microparticles or nanoparticles that scatter visible light (e.g. to create a paint-like appearance) but are substantially transparent to infrared light, allowing the underlying structure to function. In some approaches, the ZnO or FeO particles may be embedded in an infrared-transparent binder or matrix material.

Laminar embodiments can be mounted on a thin flexible structure (e.g. a polymer film such as Kapton), and then this laminar structure can be applied as a cover to an object of interest by "wallpapering" the object (e.g. using an adhesive to attach the laminar structure to the surface of the object). On the other hand, composition embodiments can be mixed with suitable binders, and then this composition can be applied as a cover to an object of interest by "painting" the object (e.g. brushing, rolling, or spraying the composition onto the surface of the object).

Laminar embodiments may be fabricated by either by colloidal assembly or by photolithography. In a colloidal assembly approach, the conducting particles randomly self-assemble on the conducting surface (e.g. as in FIG. 1A); to provide a desired surface density of variously-sized particles, the colloidal suspension of the conducting particles can include selected concentrations of the different particles. In a photolithographic approach, a lift-off process can be employed that entails depositing a negative photoresist on the dielectric spacer layer; exposing the photoresist with the desired pattern of conducting particles; evaporating gold onto the exposed photoresist; and then dissolving the photoresist to leave behind the conducting particles. After the conducting particles are arranged on the conducting surface (either by colloidal assembly or by photolithography), the arrangement may be covered with a layer of infrared-transparent material to protect and/or conceal the structure. To provide a thin flexible structure for "wallpapering," a thin flexible layer may be placed on a substrate, with the conducting surface deposited on top of the thin flexible layer; then, after the conducting particles have been arranged on the conducting surface, the thin flexible layer can be peeled off of the substrate.

Composition embodiments may be fabricated by colloidal assembly, e.g. by placing the larger particles in a colloidal suspension of the smaller particles and allowing the smaller particles to self-assemble on the surfaces of the larger particles. Again, to provide a desired surface density of variously-sized particles, the colloidal suspension of the conducting particles can include selected concentrations of the different particles; alternatively, the composition can be made up of several batches of larger particles, the first batch assembling smaller particles of a first size on the larger particles, the second batch assembling smaller particles of a second size on the larger particles, and so on. The assembled particles can then be mixed with a suitable infrared-transparent binder for "painting."

All of the U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A composition, comprising:
   a plurality of conducting larger particles; and
   for each of the conducting larger particles, a plurality of conducting smaller particles arranged on a surface of the conducting larger particle, each conducting smaller particle having a flat surface that faces the conducting larger particle, wherein the surface of the conducting larger particle is locally planar under each conducting smaller particle forming a planar gap region between the conducting larger particle and each conducting smaller particle;
   wherein the pluralities of conducting smaller particles are arranged to provide a selected thermal emissivity spectrum for the composition with respect to a specific radiative cooling efficiency for the composition.

2. The composition of claim 1, wherein the conducting larger particles have dimensions greater than about 10 microns and smaller than about 2-3 millimeters.

3. The composition of claim 1, wherein the conducting smaller particles have dimensions greater than about 200 nanometers and smaller than about 5 microns.

4. The composition of claim 1, further comprising: an infrared-transparent binder.

5. The composition of claim 4, further comprising: a diluent or solvent.

6. The composition of claim 1, wherein the selected thermal emissivity spectrum is a thermal emissivity spectrum that reduces a thermal signature of the composition by a first factor while reducing a radiative cooling efficiency of the composition by a second factor substantially smaller than the first factor.

7. The composition of claim 6, wherein the reduced thermal signature is less than one-third, one-fifth, or one-tenth of a thermal signature of a blackbody having a same actual temperature as the composition.

8. The composition of claim 7, wherein the radiative cooling efficiency is greater than one-quarter, one-half, or three-quarters of a radiative cooling efficiency of the blackbody having the same actual temperature as the composition.

9. The composition of claim 6, wherein the thermal signature corresponds to thermal radiance integrated over a selected spectral range of infrared wavelengths.

10. The composition of claim 6, wherein the thermal signature corresponds to a product of thermal radiance times atmospheric transmission as a function of wavelength, integrated over all infrared wavelengths.

11. The composition of claim 6, wherein the thermal signature corresponds to a product of thermal radiance times thermal detector response as a function of wavelength, integrated over all infrared wavelengths.

12. The composition of claim 6, wherein the radiative cooling efficiency corresponds to thermal radiance integrated over all infrared wavelengths.

13. The composition of claim 1, wherein the selected thermal emissivity spectrum provides:
    an apparent temperature of the composition that is substantially less than an actual temperature of the composition; and
    an actual radiative cooling rate that is substantially greater than an apparent radiative cooling rate.

14. The composition of claim 13, wherein the apparent temperature corresponds to a temperature of a blackbody having a blackbody thermal radiance in a selected spectral range equivalent to an actual thermal radiance of the composition in the selected spectral range.

15. The composition of claim 13, wherein the apparent radiative cooling rate corresponds to a radiative cooling rate of a blackbody having the apparent temperature.

16. The composition of claim 1, further comprising, for each of the conducting larger particles: a spacer layer occupying the planar gap region between the larger particle and each smaller particle.

17. The composition of claim 16, wherein the spacer layer is a layer of material transparent to thermal infrared radiation.

18. The composition of claim 17, wherein the material is ZnS or ZnSe.

19. The composition of claim 1, wherein the conducting smaller particles are noble metal particles.

20. The composition of claim 19, wherein the noble metal particles are gold particles.

21. The composition of claim 1, wherein each of the conducting smaller particles has a resonant wavelength selected from a set of resonant wavelengths, the set of resonant wavelengths corresponding to a set of sizes of the conducting smaller particles.

22. The composition of claim 21, wherein the set of sizes of the conducting smaller particles is a set of lengths of the planar gap regions.

23. The composition of claim 21, wherein the selected thermal emissivity spectrum includes:
    one or more spectral ranges of enhanced thermal emissivity that include the set of resonant wavelengths; and
    one or more spectral ranges of suppressed thermal emissivity that exclude the set of resonant wavelengths.

24. The composition of claim 23, wherein the one or more spectral ranges of suppressed thermal emissivity include a selected spectral range, and the set of resonant wavelengths includes one or more resonant wavelengths below a lower wavelength limit of the selected spectral range or above an upper wavelength limit of the selected spectral range.

25. The composition of claim 24, wherein the set of resonant wavelengths one or more lower wavelengths below the lower wavelength of the selected spectral range and one or more upper wavelengths above the upper wavelength of the selected spectral range.

26. The composition of claim 1, wherein, for each of the larger particles, the plurality of conducting smaller particles is a colloidal assembly of the conducting smaller particles on the conducting larger particle.

27. The composition of claim 9 wherein the selected spectral range is a range of atmospheric transmission of thermal infrared radiation.

28. The composition of claim 1, wherein either or both a size and a shape of each of the pluralities of conducting smaller particles are selected to provide the selected thermal emissivity spectrum for the composition.

29. The composition of claim 1, wherein the pluralities of conducting smaller particles are arranged by colloidal assembly.

30. The composition of claim 1, wherein the pluralities of conducting smaller particles are arranged by photolithography.

31. A composition, comprising:
   a plurality of conducting larger particles; and
   for each of the conducting larger particles, a plurality of conducting smaller particles arranged on a surface of the conducting larger particle, each conducting smaller particle having a flat surface that faces the conducting larger particle, wherein the surface of the conducting larger particle is locally planar under each conducting smaller particle forming a planar gap region between the conducting larger particle and each conducting smaller particle;
      wherein the pluralities of conducting smaller particles are arranged to provide a selected thermal emissivity spectrum for the composition, and
      wherein the selected thermal emissivity spectrum is a thermal emissivity spectrum that reduces a thermal signature of the composition by a first factor while reducing a radiative cooling efficiency of the composition by a second factor substantially smaller than the first factor.

32. A composition, comprising:
   a plurality of conducting larger particles; and
   for each of the conducting larger particles, a plurality of conducting smaller particles arranged on a surface of the conducting larger particle, each conducting smaller particle having a flat surface that faces the conducting larger particle, wherein the surface of the conducting larger particle is locally planar under each conducting smaller particle forming a planar gap region between the conducting larger particle and each conducting smaller particle;
      wherein the pluralities of conducting smaller particles are arranged to provide a selected thermal emissivity spectrum for the composition, and
      wherein the selected thermal emissivity spectrum provides:
         an apparent temperature of the composition that is substantially less than an actual temperature of the composition; and
         an actual radiative cooling rate that is substantially greater than an apparent radiative cooling rate.

* * * * *